United States Patent [19]

Bubanko

[11] 4,385,801

[45] May 31, 1983

[54] FIBRE-TO-FIBRE CONNECTOR INCLUDING A COMPONENT FOR JOINING IT TO AN OPTICAL CABLE

[75] Inventor: Vladimir Bubanko, Velizy, France

[73] Assignee: Compagnie Generale d'Electricite, Paris, France

[21] Appl. No.: 196,500

[22] PCT Filed: Aug. 29, 1979

[86] PCT No.: PCT/FR79/00077

§ 371 Date: Apr. 29, 1980

§ 102(e) Date: Apr. 24, 1980

[87] PCT Pub. No.: WO80/00498

PCT Pub. Date: Mar. 20, 1980

[30] Foreign Application Priority Data

Aug. 29, 1978 [FR] France .................... 78 24865

[51] Int. Cl.³ .............................................. G02B 5/14
[52] U.S. Cl. .................................................. 350/96.21
[58] Field of Search .................. 350/96.22, 96.2, 96.21

[56] References Cited

U.S. PATENT DOCUMENTS 4,123,137 10/1978 Marcatili .................... 350/96.22
4,203,650 5/1980 Millet et al. ................ 350/96.22
4,279,468 7/1981 Turley et al. ............... 350/96.22

*Primary Examiner*—Eli Lieberman
*Attorney, Agent, or Firm*—Sughrue, Mion, Zinn, Macpeak & Seas

[57] ABSTRACT

The invention relates to a fibre-to-fibre connector including a component for joining it to an optical fibre cable. A flat connector with two parallel layers of fibres (18) is easily connected to a round multi-fibre optical cable (12) due to the fact that it includes a separable joining component (R) provided with guide means (G5,G6) for guiding with respect to the rest of the connector (C), said component including a distributor (100,101,102) which forms two distributor channels which progressively bring the set of fibres (18) which leave the cable up to the disposition in two layers. Application to telecommunications.

9 Claims, 23 Drawing Figures

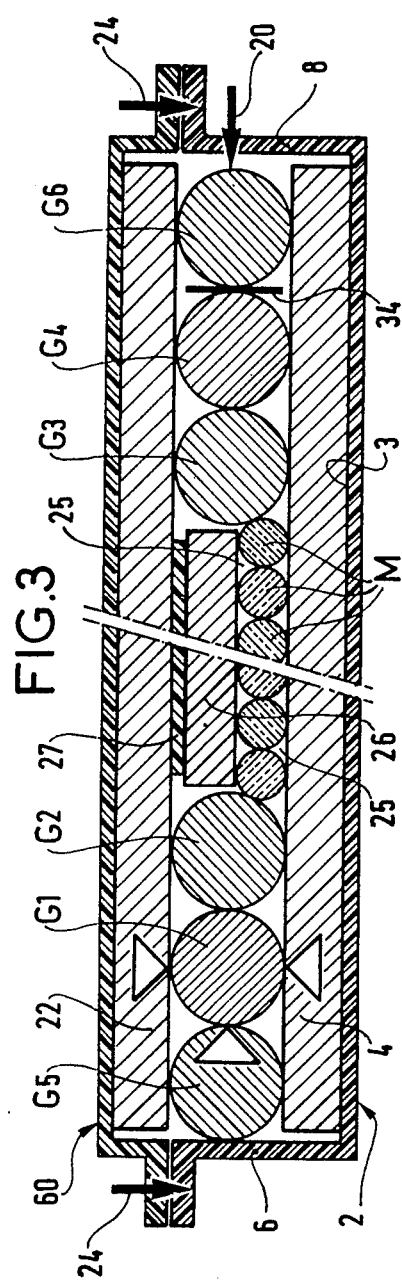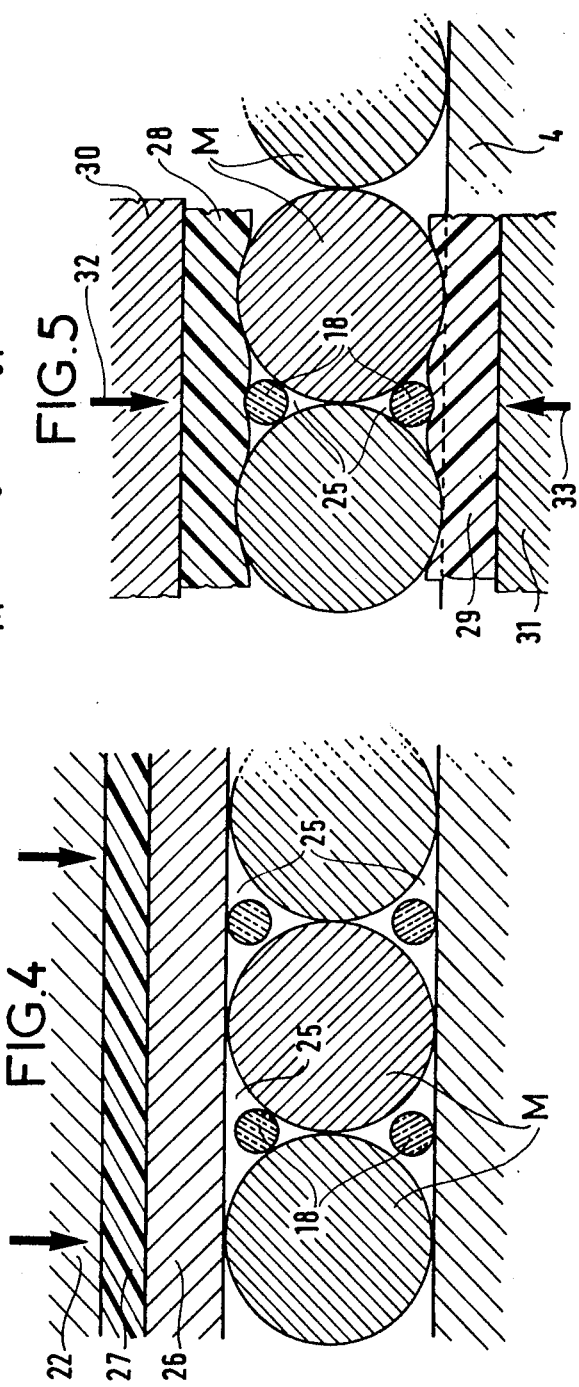

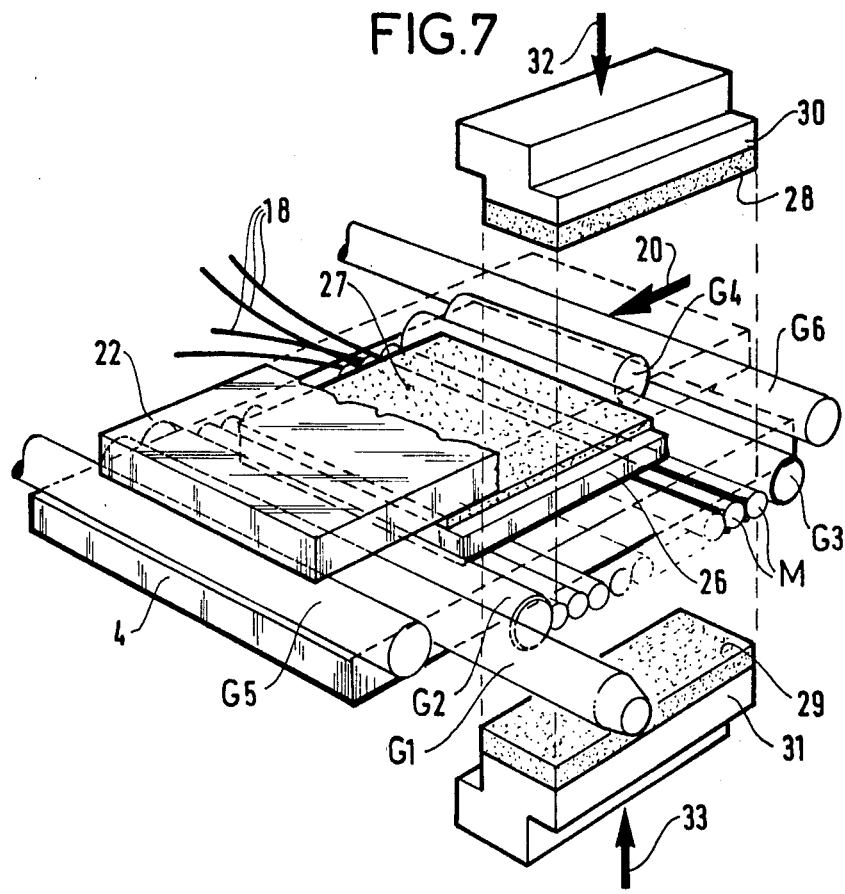
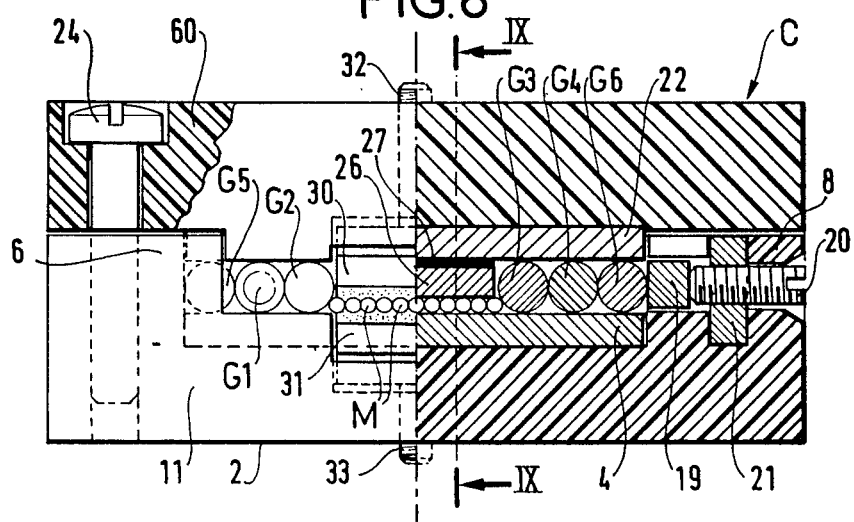

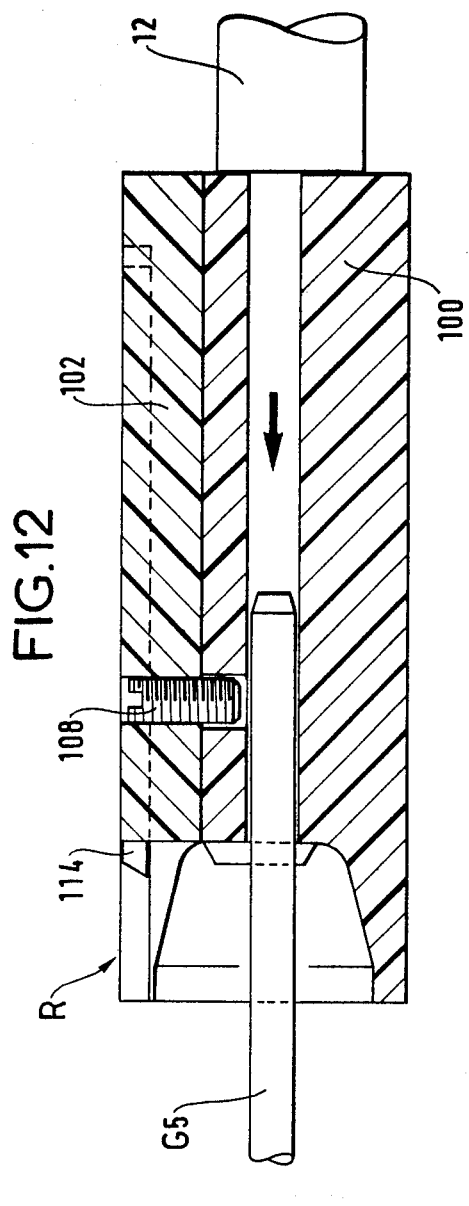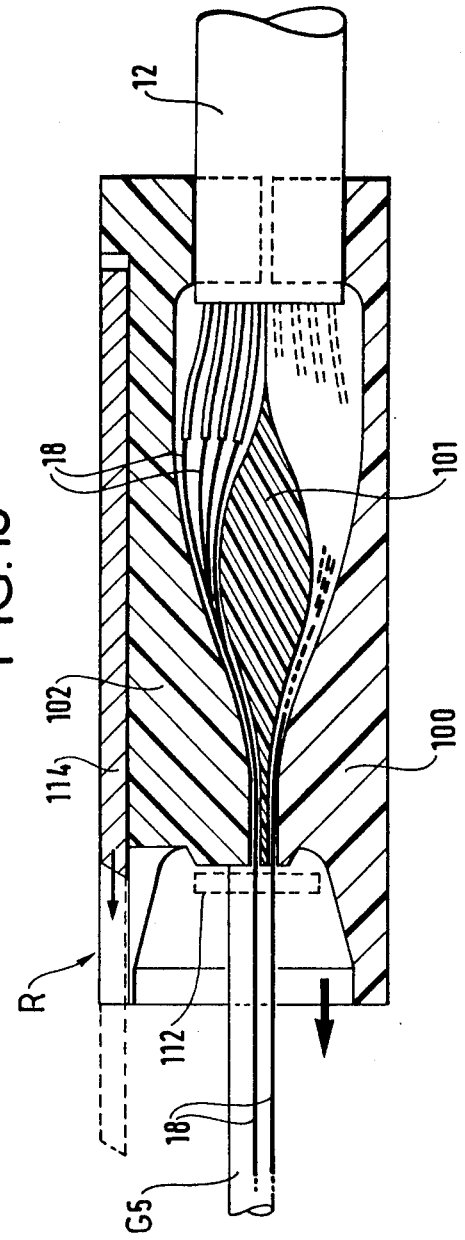

FIBRE-TO-FIBRE CONNECTOR INCLUDING A COMPONENT FOR JOINING IT TO AN OPTICAL CABLE

FIELD OF THE INVENTION

The invention relates to a fibre-to-fibre connector including a component for joining it to an optical fibre cable.

BACKGROUND OF THE INVENTION

In the field of data transmission by optical waveguides, a distinction is usually made between two main applications:

long-distance optical transmission for telecommunications; and short-distance optical transmission for data transmission on board aircraft and ships or in industrial installations.

The first application relates to optical fibre cables in which each optical conductor or fibre conveys data different from that of the other fibres. Connections must be made in the fibre-to-fibre configuration and a multi-contact connector must provide individual one to one connection of the fibres.

The second application relates to optical fibre cables in which each conductor is constituted by a plurality of fibres. Within any one conductor, each fibre conveys the same data as neighbouring fibres. Connection is made on an overall conductor-to-conductor basis via an optical mixer which is usually constituted by a glass cylinder with two optical indices, the cross-section of the core of said cylinder covering the hexagonal bundle constituted by the fibres of the cable. The lower the packing fraction, the higher the connection loss which results therefrom. Said fraction is the ratio between the sum of the areas of the cores of the fibres and the area of the cross-section of the core of the mixer. Said loss is generally about 50%, i.e. 3 dB and is added to that which results from the mechanical production and connection tolerances of the connector parts. Therefore, in this case too, fibre-to-fibre connection is preferable.

The present invention therefore relates to both the main applications mentioned hereinabove.

When forming fibre-to-fibre connections, the difficulty arises from the need to align the optical fibres sufficiently accurately if coupling losses are to be reduced as far as possible, e.g. losses of less than 1 dB. If the fibres have, for example, a core diameter of 100 microns surrounded by lower index cladding, with a difference in index lying between $5.10^{-3}$ and $10^{-1}$, these devices must then allow the fibres to be positioned in the following conditions:

The distance between the adjacent ends of the fibres must be less than 20 microns; relative eccentricity must be less than 4 microns; relative inclination must be less than 1 degree. In the event that the index of the medium which separates the fibres matches, these tolerances become larger: 100 microns for distance and 10 microns for excentricity, inclination being unchanged. Due to the small diameter of the fibres, it is difficult to satisfy such tolerances.

That is why it may be advantageous to hold each fibre in one of the holding grooves formed by the adjacent lateral surfaces of cylindrical holding pins which are pressed against one another and form a plane layer which is pressed down onto a plane base surface. Such holding pins may be made of hard steel and be machined to great accuracy at a low cost. They are held parallel to one another and in contact in pairs by their lateral surfaces by suitable clamping means. The fibres are placed in suitable positions by guide means which guide the holding assembly constituted by the layer of holding pins.

The fibres may then be guided accurately since a very much stronger and more rigid assembly is guided and the transversal dimensions thereof are much greater than those of the fibres. These guide means may themselves be constituted by cylindrical pins made of a hard and rigid substance and which press laterally on either side of the holding assembly, and down onto the base surface. Another disposition which also uses holding and guide pins is described elsewhere, in the application for the first French certificate of addition No. 2 316 611, for "A fibre positioning device" equivalent to U.S. Pat. No. 4 050 783 (inventor: Andre Tardy). In accordance with said other disposition, the holding pins are spaced out all around an axis, the holding assembly being surrounded by guide pins, the whole being surrounded by clamping means.

Hereinafter, the assembly formed by two complementary "connector parts" and fitted together connected to the end of a cable to connect two cables together is called a "connector". The set of components of a connector part which holds the end of a single fibre is here called a "contact part". Therefore, each connector part has as many contact parts as there are fibres in the cable. These contact parts are disposed in a "connection component" at the front of the connector part, and the rear of the connector part includes a joining component which allows it to accommodate and fix the optical fibre cable which contains the largest portion of the length of the fibres. The present invention applies more particularly to the case in which the contact parts are formed by the front ends of the holding grooves for receiving the fibres to be connected.

Known fibre-to-fibre connectors often have disadvantages which are apparent when it is required to connect a cable to a connector part. Indeed, it is then a difficult and long job to insert the set of front ends of the fibres in the set of rear ends of the holding grooves. This is due to the fact that the fibres are generally disposed in the optical fibre cable for example in a hexagonal bundle in a round cable; this is different from the disposition of the holding grooves in the connection component, said disposition being, for example, a plane layer of equidistant parallel grooves and being chosen to facilitate forming and using said connection component. Obviously, this connection difficulty increases with the number of fibres of the optical fibre cable which can be connected by the connector part. It can prevent choosing as high a number of fibres as would be desirable.

The present invention aims to produce the connector part of a fibre-to-fibre connector including a component for joining it to an optical fibre cable in which said joining component facilitates connection of the connector part to a multifibre optical fibre cable and consequently makes it possible, where necessary, to increase the number of contact parts of the connector part.

In particular, it provides a connector part as defined hereinbelow.

SUMMARY OF THE INVENTION

A fibre-to-fibre connector including a component for joining it to an optical cable, said connector, includes:

a connection component with holding grooves which each extend from a rear portion up to a front surface of said connection component and are each suitable for accommodating and holding one of the fibres which are to be connected;

said connection component also including connection guide means to guide it with respect to the connection component of a complementary connector part so as to form a fibre-to-fibre optical connection by putting the front surfaces of these two connector parts in contact with each other;

said connector also including a joining component to accommodate and fix an optical fibre cable in which the fibres which are to be connected together are disposed in a bundle configuration; and means for fixing the joining component to the rear of the connection component;

characterized in that said connector part also includes connection guide means to guide the joining component with respect to the connection component, so that in a first stage, the joining component may be moved away from the connection component; in a second stage, the cable may be fixed to the joining component and the end of each fibre may be distributed at the front of said joining component in a disposition which matches that of grooves of the connection component; and, in a third stage, the joining component may be brought close to the connection component by connection guide means until the end of each fibre engages in the holding grooves.

With reference to the accompanying schematic figures, a description will be given hereinafter by way of a nonlimiting example of how the invention may be put into practice. It must be understood that the components described and illustrated may, without going beyond the scope of the invention, be replaced by other components which fulfil the same technical functions. When the same component is illustrated in several figures, it is designated therein by the same reference symbol. In some of these figures, some bearing and clamping means are illustrated by simple arrows which bear the same reference symbols as in the other figures in which these same means are illustrated less schematically.

BRIEF DESCRIPTION OF THE DRAWING

FIG. 3 shows schematically the connection component of the connector part, some of the contact points being represented by the points of solid black triangles.

FIG. 4 illustrates partially, on a larger scale, a cross-section of said connection component in a vertical transverse plane which passes through the bearing zone of the holding pins.

FIG. 5 illustrates partially, on a larger scale, a cross-section of said connection component in a vertical transverse plane which passes through the cushions for locking the fibres in the holding grooves.

FIG. 7 is a partial exploded perspective view of the connection component, showing the general disposition of its main components.

FIG. 8 is a partial cross-section front view of the connection component illustrated less schematically than in FIG. 3.

FIG. 12 shows a cross-section of the joining component in a vertical longitudinal plane which passes through the connection guide means.

FIG. 13 shows a cross-section of the joining component in a vertical longitudinal plane which passes through the distributor passages of a fibre distributor.

DESCRIPTION OF THE PREFERRED EMBODIMENTS

Figure 1:
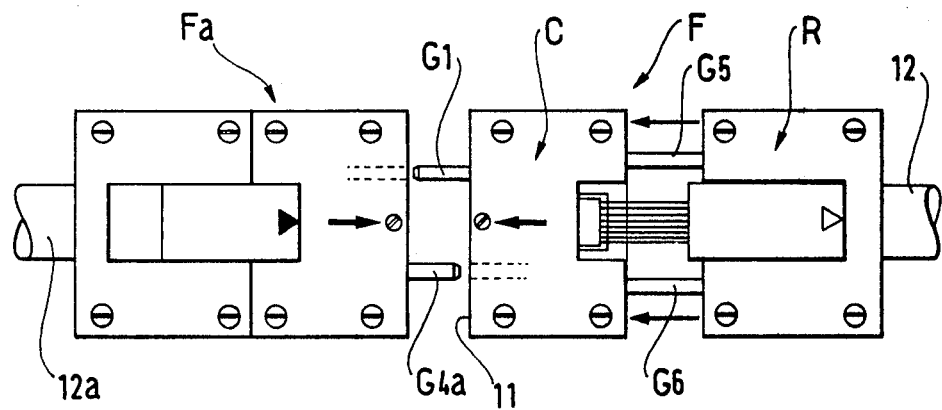
FIG. 1 is the plan view of a connector which includes two complementary connector parts in accordance with the invention, the arrows shown in the figure indicating directions of movement, and one of the two connector parts being shown with its joining component separated from its connection component.

FIG. 1 is a plan view of a connector which has two complementary connector parts F and Fa which are identical to each other except for two differences which will be mentioned hereinafter. The rear of each of these connector parts is connected to the end of a respective round optical fibre cable 12 or 12a, which cables comprise bundles of optical fibres. The cross-section of such a bundle is approximately circular or hexagonal. The front surfaces such as 11 of said connector parts face each other. The cables are optically connected together fibre to fibre when these two front surfaces come into contact with each other. Connection guide means constituted in particular by pins G1 and G4a then make the optical contact parts on each of these surfaces coincide with each other. Generally, a component of the connector part Fa which corresponds to a component of the connector part F bears the same reference numeral as said component of the connector part F, except that the letter "a" is added thereto (see FIG. 10).

The following description relates mainly to the connector part F and only those features of the complementary connector part Fa which are different from those of the connector part F will be described. The connector part F is mainly constituted by two separable components: a connection component C at the front of the connector part and a joining component R at the rear. The connection component which must be manufactured with a maximum of precision can thus be assembled in a workshop without being subject to the difficulties of assembly in the field. Likewise, the cable can be connected to the joining component at a site other than that at which optical connection is to be performed. This may for example, facilitate optical preparation of fibre ends and may also facilitate connection of the cable to the joining component.

The connection component and the joining component are designed to be fitted together after being guided with respect to each other by joining guide means constituted by two pins G5 and G6.

Figure 2:
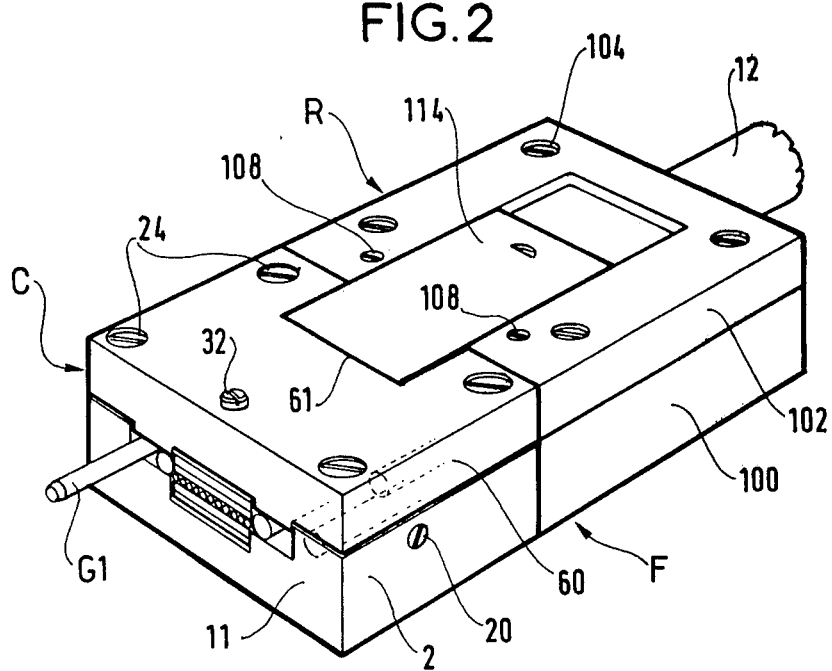
FIG. 2 is a perspective view of a connector part in accordance with the invention.
Figure 11:
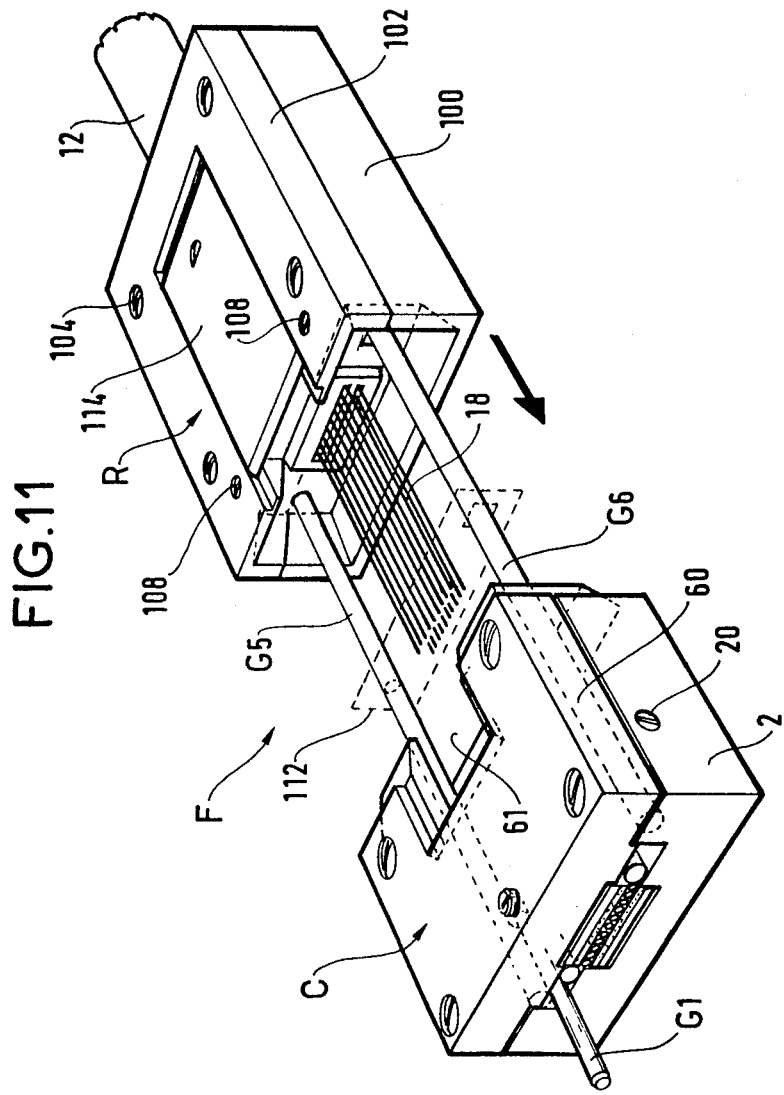
FIG. 11 is a general perspective view of the same connector part with its joining component and its connection component drawn apart from each other.

These pins guide said two components with respect to each other (see FIG. 2) to ensure that they are connected and fitted together properly (FIGS. 1 and 11).

The connection component C will now be described with reference to FIGS. 3 to 10.

Figure 6:
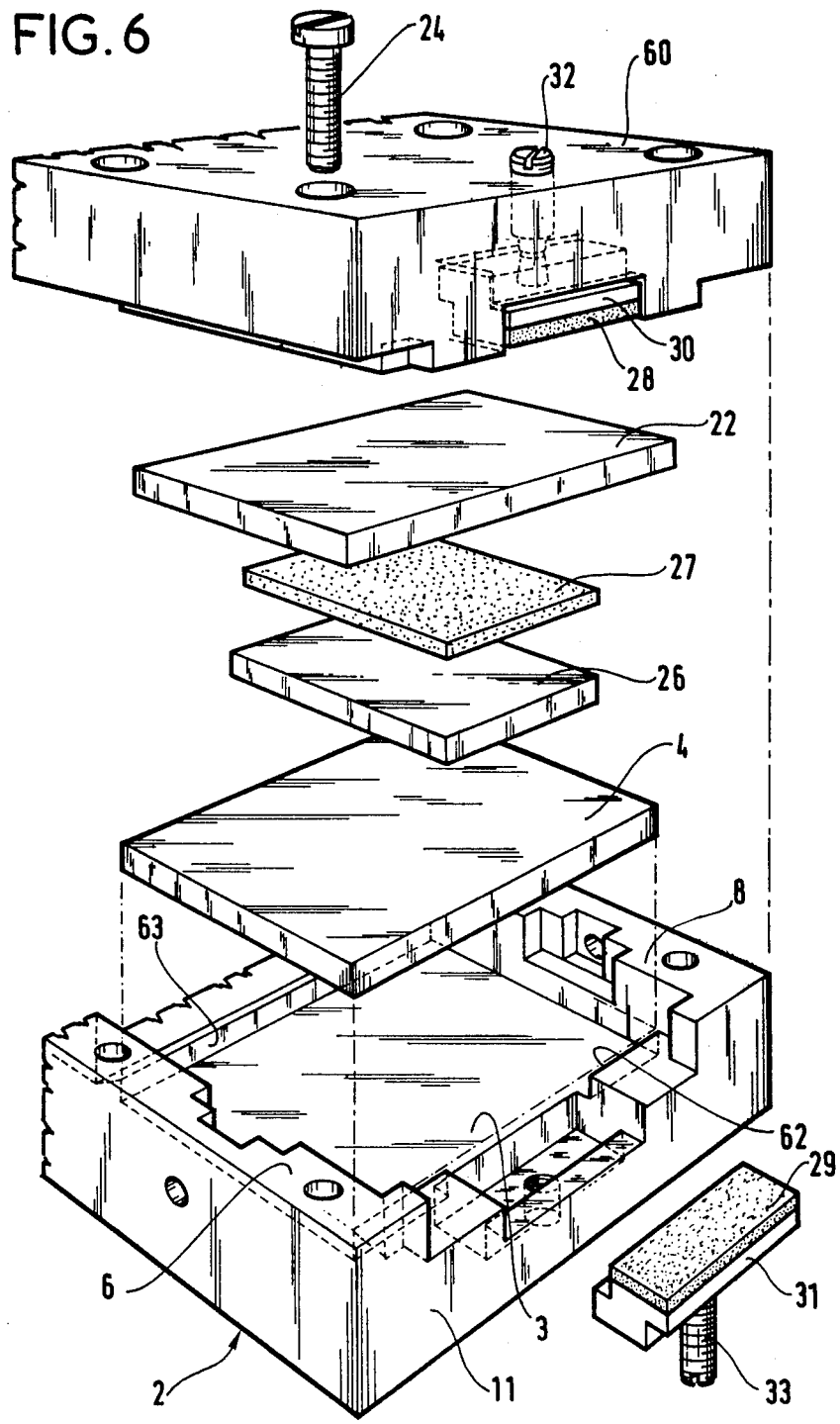
FIG. 6 is a partial exploded perspective view of the connection component.
Figure 9:
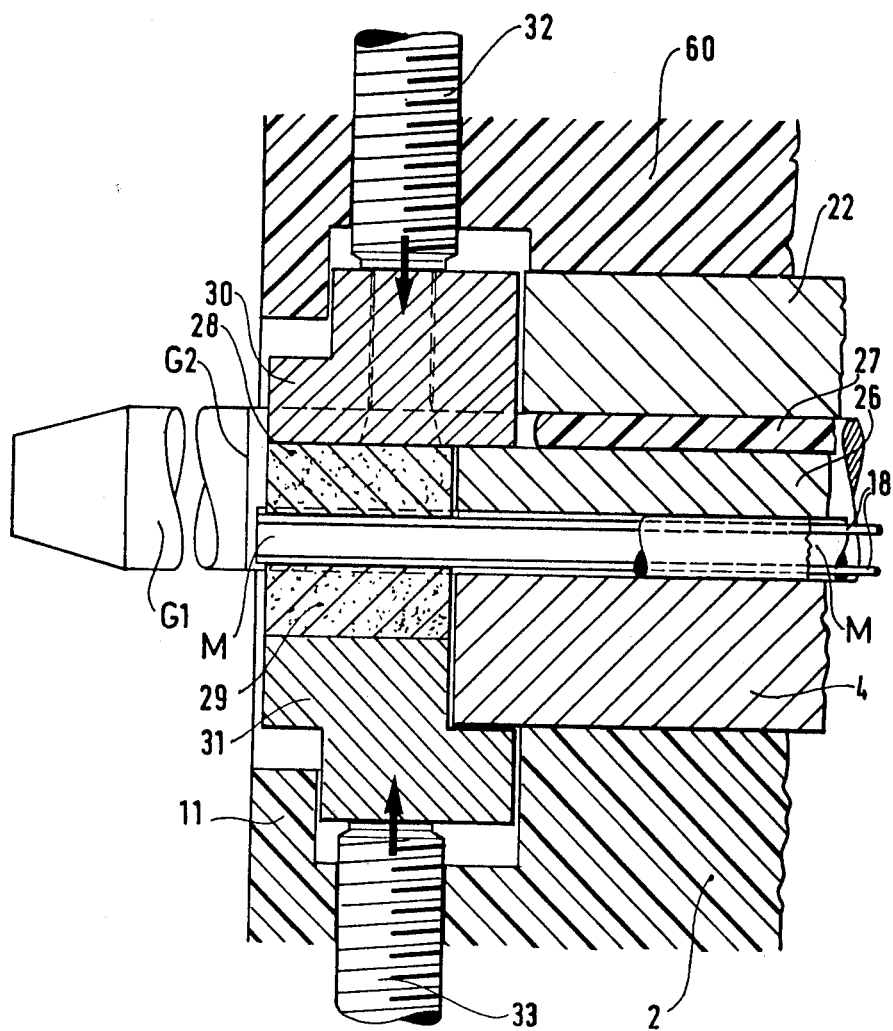
FIG. 9 shows on a larger scale a cross-section of the connection component in the vertical longitudinal plane IX—IX of FIG. 8.
Figure 10:
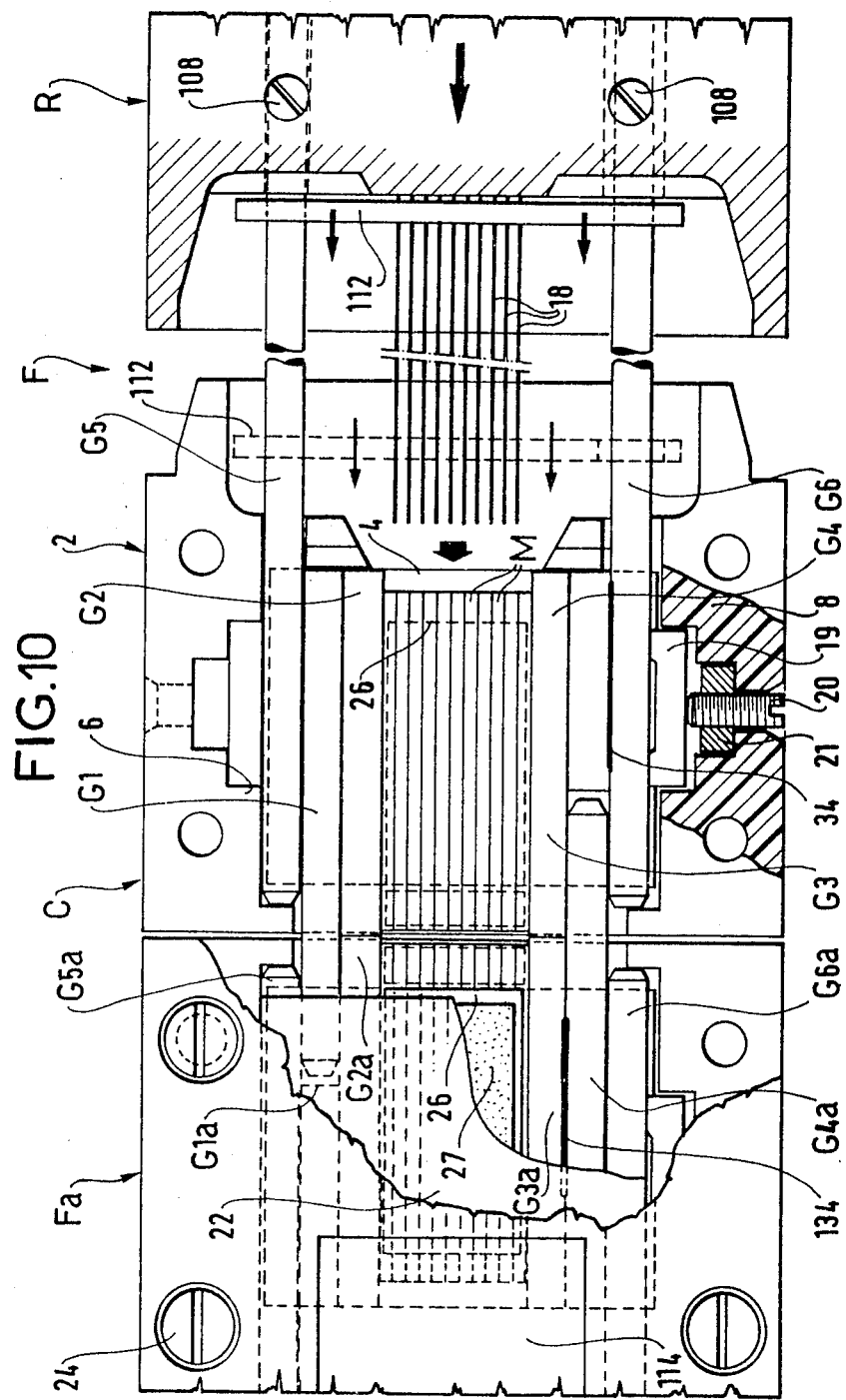
FIG. 10 is a plane of the connection component with its bearing plate removed, the connection component fitting into a complementary connection component and the illustration also shows a part of the joining component.

Its general shape is that of a housing constituted by a base 2 which is made for example of a moulded polyamide and which has a U-shaped cross-section. The intermediate portion 3 of the U is longer than the vertical arms 6 and 8 which constitute shoulders and it houses a base plate 4 of hard and rigid metal which is precision machined so that its upper surface constitutes a reference plane which is, for example, horizontal and projects above the intermediate portion 3. Said base plate is positioned laterally by shoulders 6 and 8; at the front of the base 2, it is positioned by shoulders 62 on either side of the central portion of the front surface 11, and at the rear it is positioned by a shoulder 63 (FIG. 6). Hard, rigid metal holding and guide assemblies are disposed on the base plate. Said assemblies are constituted by precision machined cylindrical pins which are parallel to one another, are disposed longitudinally and are pressed laterally against one another. The following components are installed successively on the base plate, from the shoulder 6, it being understood that corresponding components are installed opposite them in the complementary connector part Fa, two opposite components being identical except where otherwise stated:

a main reference pin G5 which extends from near the front surface 11 up to a point which is far beyond the rear edge of the base plate 4 and of the base 2 to constitute a guide means for the joining component R (FIGS. 7 and 10). One generatrix of said main reference pin constitutes the line on which the other reference rods bear and defines the lateral positions of the other reference pins;

a main male guide pin G1 which projects a long way, e.g. 10 mm, beyond the front surface 11 of the base 2, the front end of said pin being chamfered, the component which faces it in the complementary connector part Fa being a female main guide pin G1a which is set back by 11 mm for example;

a first stop pin G2 with a plane front end which projects slightly from the front surface 11, e.g. by 5 microns, the plane of the front surface of said pin being perpendicular to the longitudinal axis thereof;

a set of holding pins M. The number of said pins is equal to half the number of fibres to be connected plus one. The front surfaces of these rods are substantially in the plane of the front surface 11;

a second stop pin G3 identical to the first and placed in the same way with respect to the front surface 11;

an auxiliary female guide pin G4 whose front surface is set back with respect to the front surface 11 so as to provide a guide gap whose depth is slightly greater than the length of projection of the main guide pin G1; said gap is provided to accommodate the projecting portion of an auxiliary male guide pin G4a which forms a part of the connection component of the complementary connector part Fa. When the two connector parts are connected together, the male guide pins G1 and G4a engage in the respective gaps provided in front of the female pins such as G1a and G4 which face them;

a spacer shim 34, FIG. 10, constituted by a thin steel plate with parallel surfaces. Said shim and a corresponding shim in the complementary connector part Fa are made necessary by the fact that the diameters of the previously-mentioned pins and of those which correspond to them in the complementary connector part Fa cannot be predetermined with perfect precision. Therefore, the total width of the assembly constituted by said pins cannot be determined and the auxiliary male guide pin G4 may not be able to engage properly in the guide gap in front of the pin G4. That is why the thickness of the spacer shim 134 of the complementary contactor part Fa is at least equal to the difference between tha maximum and minimum possible total width and the thickness of the shim 34 is twice that difference; and an auxiliary reference pin G6 which extends towards the rear like the main reference pin G5 so as to guide the joining component R.

These components taken as a whole are located on the base plate 4 and a block 19, acted on by a lateral clamping screw 20, presses them against the shoulder 6. The screw 20 cooperates with a nut 21 which fits into the shoulder 8 of the base 2. Since the base 2 includes the auxiliary reference pin G6, it is symmetrical with respect to a longitudinal vertical centre plane and therefore the connector part F and the complementary connector part Fa may be formed identically.

The above-mentioned pins are all made of hard steel and are precision machined to form radially symmetrical cylinders. It is known that such machining can be performed cheaply despite the high precision which may be attained.

The diameter of the holding pins may be chosen equal to 0.55 mm for example if the diameter of the fibres is 125 microns, i.e. is more than four times greater than the diameter of the fibres. This choice is made so that the fibres 18 remain within "holding" grooves such as 25 formed between the pins. These grooves are open towards the top or the bottom and hold the fibres so they remain below the horizontal planes which are tangential to the pins. This prevents any danger of contact with the plates which hold the pins. The holding pins as a whole form a "holding" assembly, while the other pins form a "guide" assembly.

The guide pins and the stop pins preferably have a larger diameter which preferably lies between 1.5 and 3 times that of the holding pins so as to be rigid. Should these pins have too great a diameter, the lateral clamp screw 20 would tend to push the stop pins over the holding pins.

The lateral clamp screw clamps all these pins (and the shim 34) against one another and against the reference pin G5 which is itself clamped against the shoulder 6. Therefore all these pins are parallel to one another and to said bearing line, i.e. they are perpendicular to the front surface 11 providing they are held in contact with the base surface 4 by suitable pressing means. Said means are constituted by a bearing plate 22 made of a softer substance than that of the pins and of the base plate firstly to prevent any deformation of the pins or of the base plate and secondly to enable insertion of the male guide pin of the complementary connector part. The width of the base plate is almost as great as the distance between the shoulders 6 and 8 so that it is positioned by said shoulders. The mid portion of the base plate above the holding assembly has a protrusion formed by a bearing strip 26 fixed to its lower surface by means of a rubber shoe 27, FIG. 8, which, when compressed, allows an even bearing force to be exerted on the holding pins. A cover 60 is fixed to the base 2 by screws 24 and presses a bearing plate 22 downwards (FIGS. 6, 7 and 8).

Each mid portion of the front of the cover 60 and of the base 2 is provided with a recess (see FIGS. 6 and 9) to accommodate respectively an upper shoe constituted by a resilient cushion 28 fixed to a metal support 30 and a lower shoe constituted by a resilient cushion 29 fixed to a support 31. These cushions are pressed against the front portions of the upper and lower surfaces respectively of the holding assembly by means of screws 32 and 33, so as to enter the holding grooves formed in these surfaces and to hold the optical fibers 18 therein. The rear portions of the supports 30 and 31 have upward and downward protrusions which co-operate with the recesses provided in the cover 60 and the base 2 so as to prevent the shoes from moving forward out of their recesses. The front end of the bearing plate 22 and of the base plate 4 also constitute vertical stops for the supports 30 and 31 so as to prevent a force from being applied to the cushions 30 and 31 which could bend the front ends of the holding rods M.

It is apparent from what is set forth hereinabove that the holding grooves are parallel to one another and to the reference pins G5 and G6 and that the grooves form two superposed plane horizontal layers, each groove in the upper layer being above a groove in the lower layer, the distances between two grooves of the same layer always being the same. The present invention makes it possible to facilitate the insertion of the optical fibres of a cable which is round, for example, in these grooves after tightening the screws such as 20 and 24 but before tightening the screws such as 32 and 33. The screws 32 and 33 are tightened only when the longitudinal positions of the fibres along the grooves have been adjusted.

A description will now be given of the joining component R which is guided with respect to the connection component C by the reference pins G5 and G6.

Said joining component is likewise in the shape of a housing with a base 100 and a cover 102 fixed to the base by screws 104 (see FIGS. 11 and 12). The base has two longitudinal guide bores for the pins G5 and G6 and two locking screws 108 which pass through the cover to allow the joining component to be locked on said pins when the optical fibre insertion and positioning operations in the connection component are finished.

The rear edges of the base 100 and of the cover 102 also include adjacent recesses to accommodate the optical fibre cable 12 and lock it fast in the joining component.

An intermediate portion 101 is disposed between the base 100 and the cover 102. Said intermediate portion constitutes a fibre distributor guide, the lower surfaces of the cover and the upper surface of the base having recesses so that with the guide, they form two distributor passages which are symmetrical with respect to the horizontal plane defined by the axes of the hold pins M.

The rear edge of the guide is shaped like a horizontal transverse knife blade which diametrically separates into two halves the bundle of fibres which leave the round cable 12 in the joining component, the thickness of the blade increasing towards the front of said component so as to separate these two halves. Only the upper distributor passage is illustrated schematically in successive cross-sections in FIG. 14 (diagrams A to F).

The cross-section of the passage through vertical transverse planes has a shape which changes progressively from the front of the joining component.

Figure 14A:
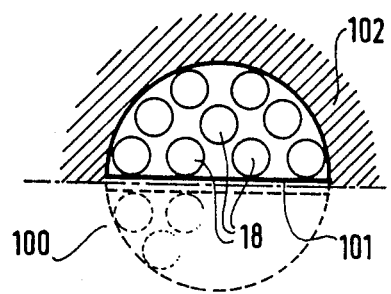
FIGS. 14A to 14F show schematically on a larger scale successive cross-sections of a distributor passage, starting from the rear of the distributor.
Figure 14B:
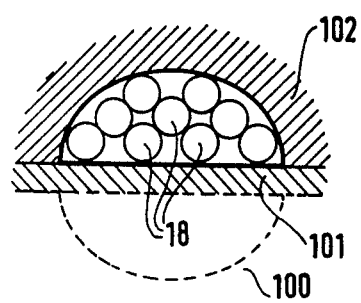
Figure 14C:
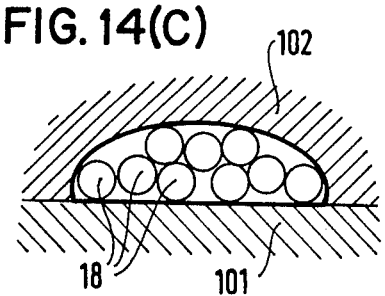
Figure 14D:
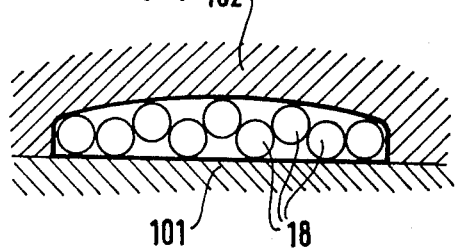
Figure 14E:
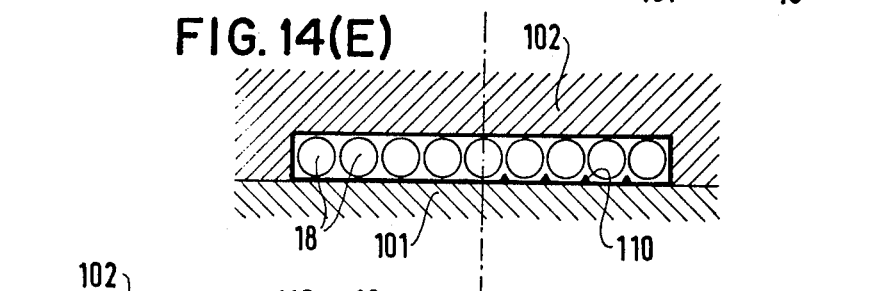
Figure 14F:
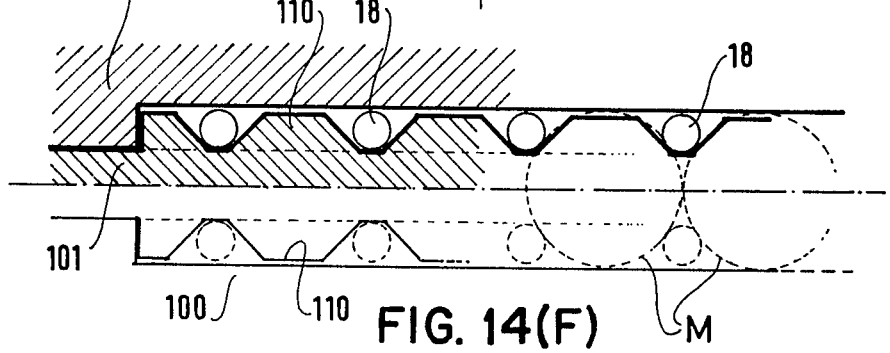

Said cross-section is firstly a semi-circle (FIG. 14A) whose arc is progressively flattened (FIGS. 14B, C and D) until the cross-section becomes a horizontal rectangle whose height is only slightly greater than the diameter of a fibre so as to dispose said fibres in a substantially contiguous formation in a plane layer (left-hand portion of FIG. 14E). Separators such as 110 then begin to protrude starting from a guide 101 so as to separate the fibres and to lay each of them in an individual distributor passage (right-hand portion of FIG. 14E). The cross-section of each individual passage then becomes curved and the rectangle lengthens without changing in height, while the separators widen until the distances between the fibres are equal to the distance between two neighbouring holding grooves in the same layer. The cross-section of each individual passage progressively becomes more and more curved so as to become horizontal and parallel again (FIGS. 13 and 14F) and so as to be substantially aligned with the holding grooves when the pins G5 and G6 are engaged in the joining component R. The distance between the two layers of distributor passages may however advantageously be slightly longer than that between the two layers of holding grooves.

In general, because of the length of the fibres which extend beyond the front surface of the joining component, aligning the individual passages with the holding grooves is insufficient alone to engage the end of each optical fibre in the rear of a holding groove when the joining component is brought towards the connection component. That is why firstly, the parts at the rear of the holding grooves are suitable arranged in the connection component C and secondly a distributor strip 112 is used which can slide on the pins G5 and G6 and which guides the fibres 18 towards the holding grooves 25.

Figure 15:
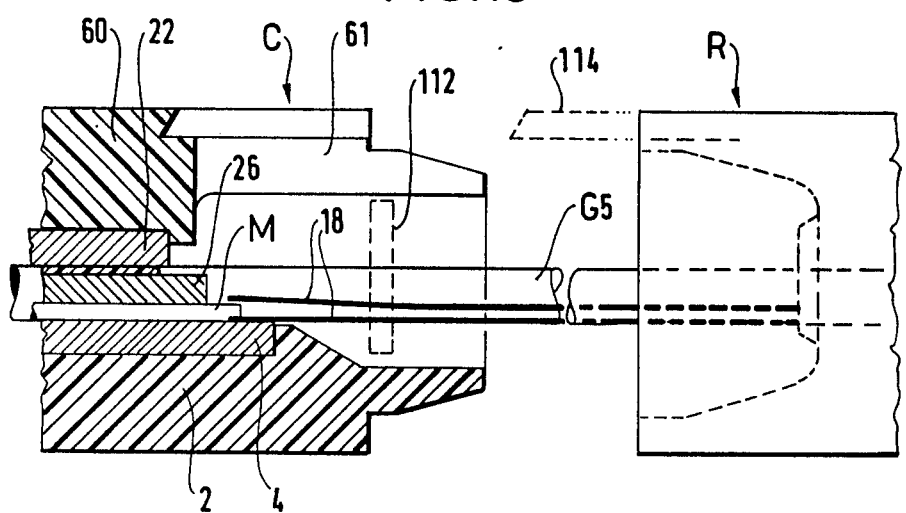
FIG. 15 shows a cross-section of the rear of the connection component in a vertical longitudinal plane and also shows a side view of the front of the joining component illustrating how the optical fibres are inserted therein.

Starting from the rear of the connection component C, FIG. 15 illustrates firstly the rear edge of the base plate 4, then the rear ends of the hold pins M laid on said base plate, then the rear edge of the bearing plate 26 which is laid on said holding pins.

Figure 16:
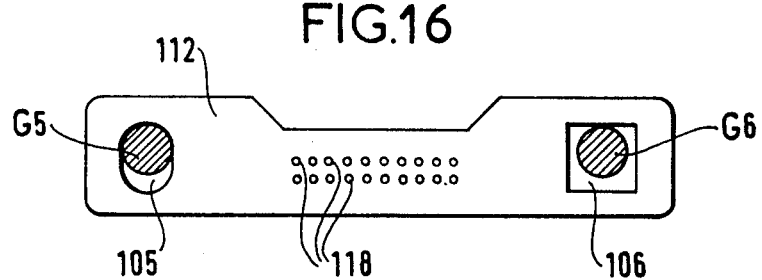
FIG. 16 illustrates the front of a distributor strip located between the connection component and the joining component and carried by connection guide means.
Figure 17:
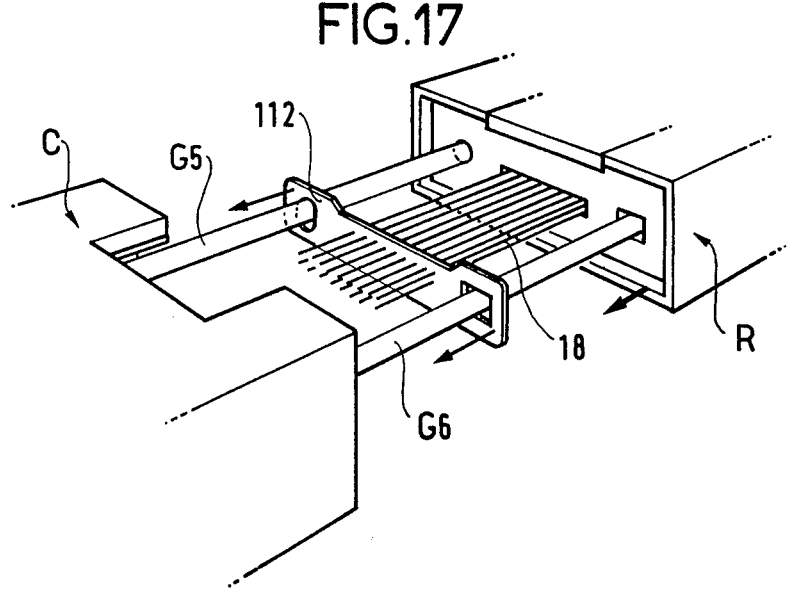
FIG. 17 is a perspective view of a gap which is temporarily formed between the connection component and the joining component and shows the position of the distribution strip.
Figure 18:
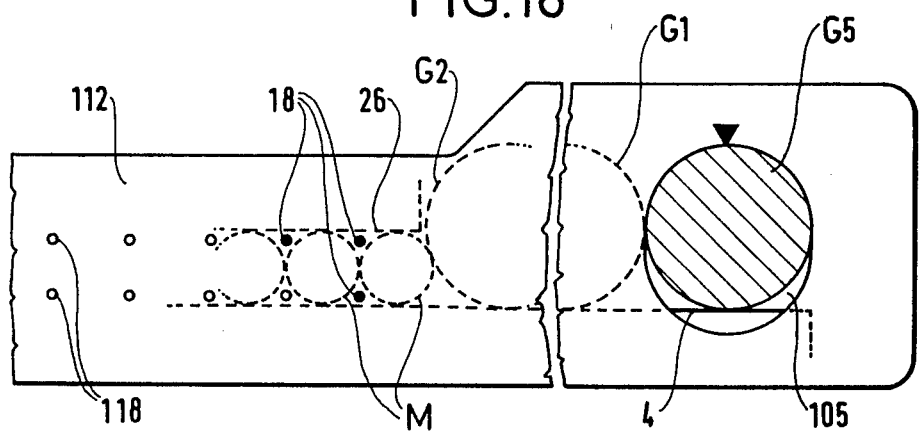
FIG. 18 illustrates partially the same distribution strip on a larger scale.

The distributor strip 112 (see FIG. 16) has two openings 105 and 106 for inserting the pins G5 and G6. There is only vertical play in the opening 105 for the main pin G5 and there is vertical and horizontal play in the opening 106 for the auxiliary pin G6. The distributor strip also has two rows of openings 118 disposed in line with the front portions of the individual distributor passages. These openings are preferably conical, i.e. they are larger on the rear surface of the distributor strip than on its front surface so as to facilitate insertion of the fibres which leave the individual passages into these openings.

To engage the optical fibres 18 in the holding grooves when the joining component R is brought close to the connection component, firstly, the distributor strip 112 is raised slightly so as to place the end of each fibre of the lower layer above the base plate 4 when they come close to the rear edge of said plate. When they pass beyond the edge, the distributor strip is lowered to a medium position which allows the end of each fibre of the lower layer to rest on the base plate 4.

These ends then engage in the holding grooves of the lower layer. The danger of the rear surface of a holding pin meeting the end of a fibre in the upper layer is then avoided because such fibres are disposed a little higher than the corresponding holding grooves. The distributor strip 112 is then placed in a low position so as to apply the end of each fibre of the upper level in the holding grooves which are intended to accommodate them and to avoid the danger of any of these ends meeting the rear edge of the plate 26.

When said edge is past, all that is necessary is to adjust the final longitudinal positions of the fibres by clamping them in their holding grooves with locking shoes.

The cover 60 of the connection component has an opening 61 above the rear of the hold assembly so as to facilitate the engagement of the fibres. When the joining component and the connection component are finally fixed together, said opening is closed by a sliding shutter 114, FIG. 2 on the joining component. Sealing between the two mating parts is improved by providing for the connection component to fit into the joining component or vice-versa.

It is clear that the shape(s) of the fibre distributor passage(s) can be adapted to various shapes of connection component. The connection components may have more or fewer than two plane layers of grooves or a cylindrical layer of grooves for various cable shapes, round or flat. Further, the fibre distributor strip may equally well be shaped like two combs with vertical teeth between the fibres.

It is apparent from what is set forth hereinabove that the subject matter of the present invention may be exposed not only by the previously set forth definition which constitutes a first point 1, but also by the following points:

2. A connector according to point 1, characterized in that the connection component includes:
  a housing constituted by a base (2) and a cover (60), which housing may be formed by moulding a plastic material or an alloy and contains a set of precision machined detachable parts:
  a base plate (4) made of hard metal;
  a bearing plate (22) made of a substance which is not so hard, said bearing plate being provided with a bearing strip (26) which protrudes below the mid portion of its lower surface;
  a holding assembly constituted by holding pins (M) which press vertically on the base plate by means of the bearing strip and laterally against one another so as to form said holding grooves between their side surfaces; and
  a guide assembly (G1, G6) constituted by pins which press laterally against one another and vertically on the base plate by means of the bearing plate, one of the generatrixes of one of these pins (G5) constituting a lateral positioning and bearing reference line, some of these pins pressing laterally against the holding assembly, said guide assembly constituting said connection guide means and said joining guide means.

3. A connector according to point 1, characterized in that said joining component (R) includes a fibre distributor (100, 101, 102) which forms at least one distribution passage which extends from the rear to the front of said distributor, the rear portion of the passage having a cross-section which is suitably shaped to accommodate at least part of the bundle of the fibres of an optical fibre cable (12), the cross-section of said passage changing shape progressively towards the front so as to force the fibres to form the configuration of the holding grooves in which said fibres (18) are to be inserted.

4. A connector according to point 3 in which said holding grooves are parallel to one another and form two superposed plane layers, characterized in that the distributor (100, 101, 102) forms two distribution passages, the cross-sections of these two passages forming, at the rear of said distributor, substantially two halves of the same circle separated by a diameter which is parallel to said plane layers, the cross-section of each of these passages substantially changing progressively into a rectangular shape with the length of the rectangle substantially in line with one of said plane layers, said cross-section then being progressively separated into several individual passages by separators (110) which extend from the large sides of the rectangle, the front ends of said individual passages being disposed substantially in line with said holding grooves.

5. A connector according to point 3, characterized in that the distribution passage has an upper wall and a lower wall each formed by a distinct portion of the distributor, these two portions (102, 101) being separable from each other so as to allow firstly the laying of the optical fibres (18) on a first portion (101) and then forcing them to be distributed suitably by pressing the second portion (102) against the first.

6. A connector according to point 5, characterized in that the distributor forms two superposed distributor passages and has three portions (100, 101, 102) of which the intermediate portion (101) forms a wall of each of these two distributor passages.

7. A connector according to point 1, characterized in that it also includes a distribution strip (112) disposed between the connection component (C) and the joining component R, said strip having guide openings (118) for the fibres (18) and itself being guided by said connection guide means (G5, G6) with play which, when the joining component is brought close to the connection component, allows the position of each fibre end to be adjusted so as to facilitate its insertion in the holding grooves (25).

8. A connector according to point 2, characterized in that starting from the rear of the connection component (C) there are disposed successively the rear edge of the base plate, then the rear ends of the hold pins (M), then the rear edge of the bearing strip (26) which makes said pins (M) bear on the base plate (4).

9. A connector according to point 2, characterized in that it also includes two deformable cushions (28, 29) to press against the optical fibres in the front ends of the holding grooves (25) formed between the holding pins (M) respectively on the two surfaces of the layer formed by said pins;
  stop means (26, 30, 31, 4) being provided to limit the pressure of said cushions on the front ends of said pins.

I claim:

1. A fibre-to-fibre connector for connecting fibre cables (12, 12a) comprised of a plurality of optical fibres (18), said connector comprising end-to-end abutting connector parts (F, Fa), each connector part including a joining component (R) for joining it to an optical cable and a connection component for connecting end abutting connector parts together, and wherein;

each connection component (C) including a front surface (11), precision means forming a holding assembly defining holding grooves (25) which each extend from a rear portion of said connection component up to said front surface (11) thereof and which are each suitable for accommodating and holding one of the fibres (18) which are to be connected, first connection guide means (G1) to guide it with respect to the connection component of a complementary connector part (Fa) so as to form a fibre-to-fibre optical connection by accurate positioning of the front surfaces of said two connector parts (F, Fa) in contact with each other;

second connection guide means (G5, G6) engaging said joining component (R) to guide the joining component with respect to the connection copmonent (C), so that in a first stage, the joining component may be moved away from the connection component guided by said second guide means; in a second stage, the cable (12) may be fixed to the joining component with said joining component and said connection component separated and the end of each fibre (18) may be distributed at the front of said joining component in a disposition which matches that of the holding grooves (25) of the connection component; and, in a third stage, the joining component may be brought close to the connection component by said first connection guide means until the end of each fibre engages in the holding grooves, and wherein;

said first and second guide means comprise laterally contacting precision hard metal pins interposed at opposite sides of said holding assembly and in lateral contact therewith, and wherein at least one of said guide pins forming said first connection guide means projects outwardly beyond the front surface (11) of said respective connection components for precision fitting within a correspondingly sized precision recess of the front surface of the other said connection component, and wherein said second connection guide means comprises at least one other of said laterally contacting hard metal pins which projects outwardly at the rear of said connection component and wherein said connection component comprises a fixed lateral surface as a frame of reference for said lateral contacting precision hard metal pins and said holding assembly to precisely locate the fibres of both connection parts and for assuring for said fibres of respective connector parts end abutting alignment therebetween.

2. A connector according to claim 1, wherein the connection component includes:
a housing constituted by a base (2) and a cover (60), said housing containing a set of precision machined detachable parts defined by said holding assembly and said first connection guide means and said second connection guide means; said precision machined detachable parts further comprising:
a base plate (4) made of hard metal;
a bearing plate (22) made of a substance which is not as hard as said base plate, said bearing plate being provided with a bearing strip (26) which protrudes from the mid portion of the gap between the bearing plate and the base plate;
and wherein said holding assembly is constituted by holding pins (M) which press vertically on the base plate by means of the bearing strip and laterally against one another so as to form said holding grooves between their side surfaces.

3. A connector according to claim 2, wherein said joining component (R) includes a fibre distributor (100, 101, 102) which forms at least one distribution passage which extends from the rear to the front of said distributor, the rear portion of the passage having a cross-section which is suitably shaped to accommodate at least part of the bundle of the fibres of an optical fibre cable (12), the cross-section of said passage changing shape progressively towards the front so as to force the fibres to form the configuration of the holding grooves in which said fibres (18) are to be inserted.

4. A connector according to claim 1, wherein said joining component (R) includes a fibre distributor (100, 101, 102) which forms at least one distribution passage which extends from the rear to the front of said distributor, the rear portion of the passage having a cross-section which is suitably shaped to accommodate at least part of the bundle of fibres of an optical fibre cable (12), the cross-section of said passage changing shape progressively towards the front so as to force the fibres to form the configuration of the holding grooves in which said fibres (18) are to be inserted, and wherein said holding grooves are parallel to one another and form two superposed plane layers, and wherein the distributor (100, 101, 102) forms two distribution passages, the cross-section of said two passages forming, at the rear of said distributor, substantially two halves of the same circle separated by a diameter which is parallel to said plane layers, the cross-section of each of said passages subsequently changing progressively into a rectangular shape having a long dimension of the rectangle substantially in line with one of said plane layers, said cross-section then being progressively separated into several individual passages by separators (110) which extend from the large sides of the rectangle, the front ends of said individual passages being disposed substantially in line with said holding grooves.

5. A connector according to claim 4, wherein the distribution passage has an upper wall and a lower wall each formed by a distinct portion of the distributor, these two portions (102, 101) being separable from each other so as to allow firstly the laying of the optical fibres (18) on a first portion (101) and then forcing them to be distributed suitably by pressing the second portion (102) against the first.

6. A connector according to claim 5, wherein the distributor forms two superposed distributor passages and has three portions (100, 101, 102) of which the intermediate portion (101) forms a wall of each of these two distributor passages.

7. A connector according to claim 2, further including a distribution strip (112) disposed between the connection component (C) and the joining component R, said strip having guide openings (118) for the fibres (18) and means for guiding said strip by said connection guide means (G5, G6) with play which, when the joining component is brought close to the connection component, allows the position of each fibre end to be adjusted so as to facilitate its insertion in the holding grooves.

8. A connector according to claim 2, wherein starting from the rear of the connection component (C) there are disposed successively the rear edge of the base plate, the rear ends of the holding pins (M), and the rear edge of the bearing strip (26) which makes said pins (M) bear on the base plate (4).

9. A connector according to claim 2, further including two deformable cushions (28, 29), means for pressing said cushions against the optical fibres in the front ends of the holding grooves (25) formed between the holding pins (M) respectively on the two surfaces of the layer formed by said pins; and stop means (26, 30, 31, 4) to limit the pressure of said cushions on the front ends of said pins.

* * * * *